United States Patent [19]

Smith

[11] Patent Number: 4,504,074
[45] Date of Patent: Mar. 12, 1985

[54] STEERING SYSTEM

[75] Inventor: Daniel G. Smith, Reedley, Calif.

[73] Assignee: Upright, Inc., Berkeley, Calif.

[21] Appl. No.: 502,258

[22] Filed: Jun. 8, 1983

[51] Int. Cl.³ .............................................. B62D 3/02
[52] U.S. Cl. ...................................... 280/93; 474/141
[58] Field of Search ................. 280/93, 263, 267, 269, 280/771; 74/570; 474/141

[56] References Cited

U.S. PATENT DOCUMENTS

| 2,875,842 | 3/1959 | Morrell | 280/93 |
| 2,982,564 | 5/1961 | Schreck | 280/93 |
| 3,018,116 | 1/1962 | Summers et al. | 280/91 |
| 3,972,538 | 8/1976 | Breame | 280/93 |
| 4,257,619 | 3/1981 | Fisher | 280/91 |

FOREIGN PATENT DOCUMENTS 1197816 12/1959 France ............................. 280/93

Primary Examiner—Joseph Jr. Peters, Jr.
Assistant Examiner—Ross Weaver
Attorney, Agent, or Firm—Phillips, Moore, Lempio & Finley

[57] ABSTRACT

A steering system for a four-wheeled vehicle which can rotate the front steering wheels unequally as the vehicle is turning in order to prevent excessive tire scuffing and which can provide a zero turning radius of the vehicle about its inside rear wheel. The two front steering wheels each has its own vertical pivot post. Standard roller chains are trained around eccentric sprockets mounted on the pivot posts and a drive sprocket which is rotatable by a manually operable steering member. Positive chain tauteners maintain the chains taut as the distance from the eccentric sprockets to the drive sprocket varies during turning.

6 Claims, 11 Drawing Figures

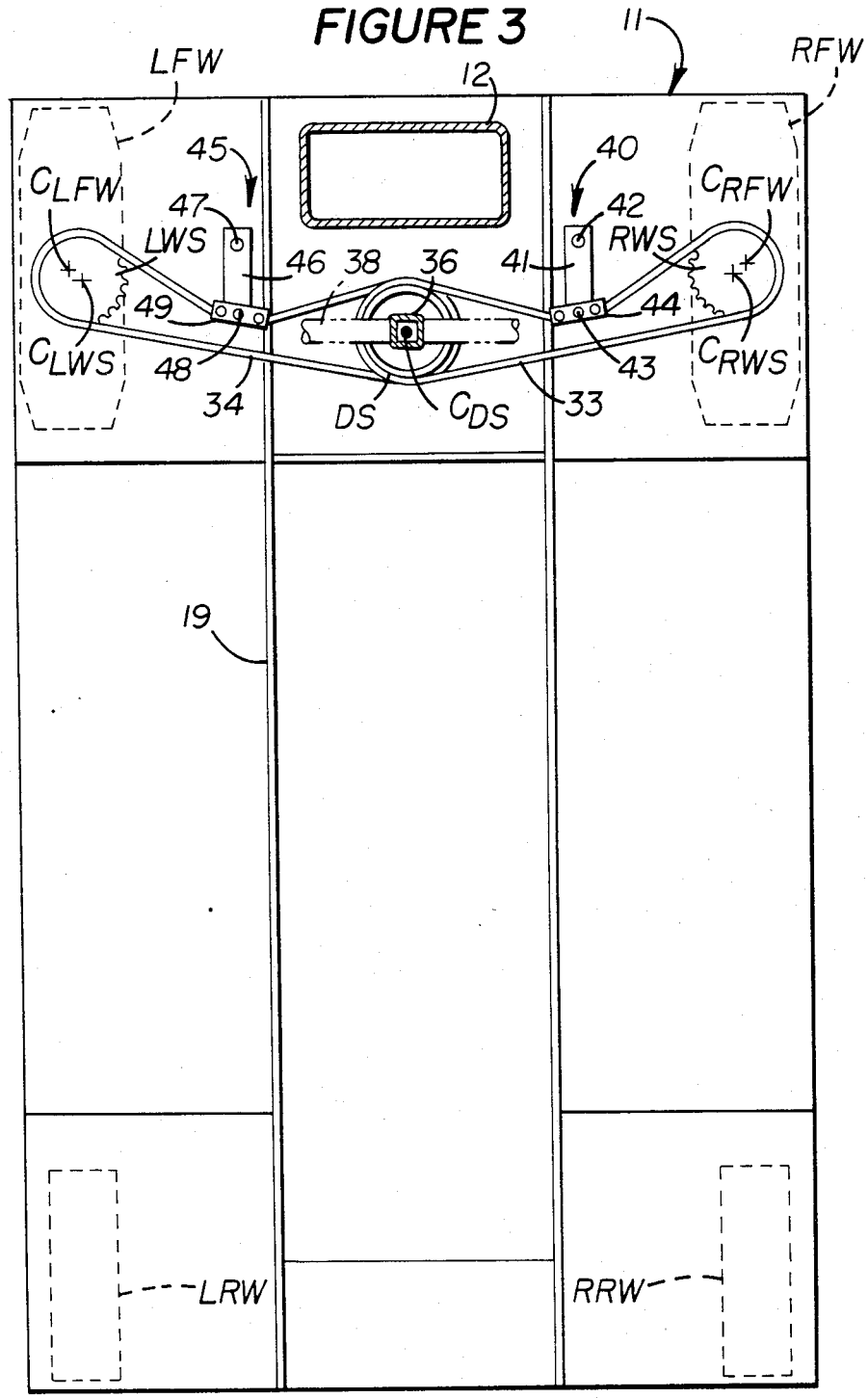

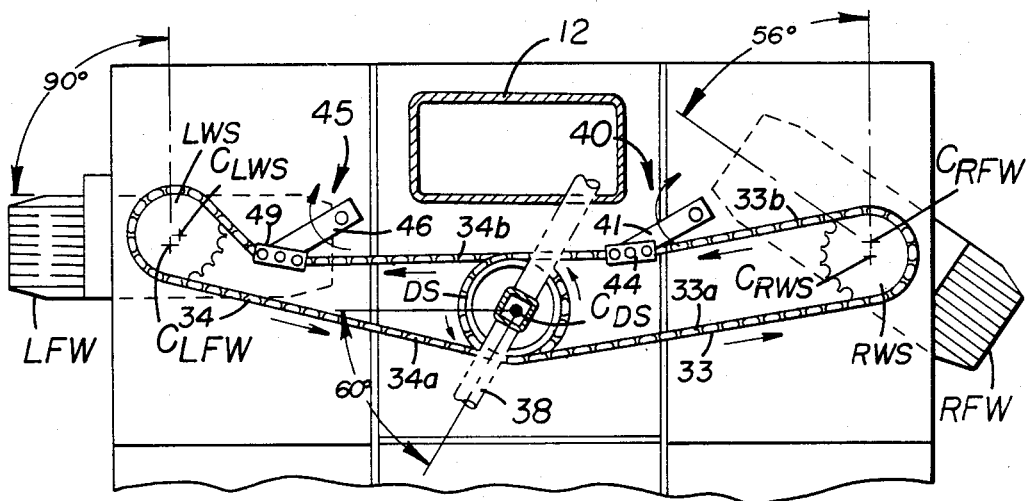
FIGURE 5
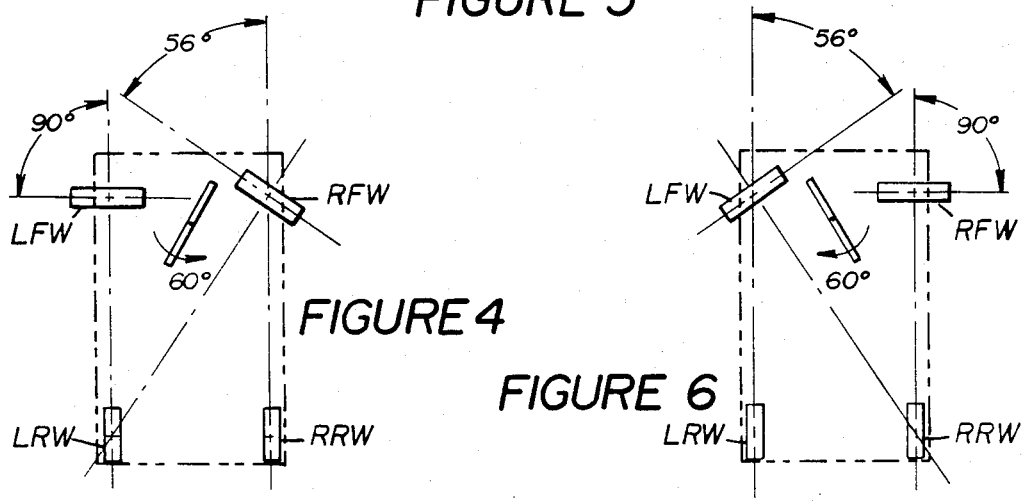
FIGURE 4
FIGURE 6
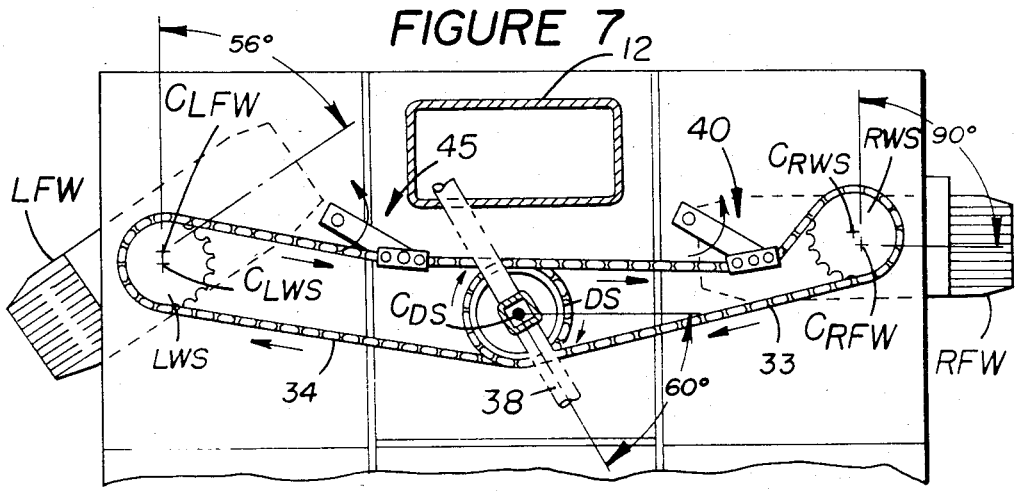
FIGURE 7

STEERING SYSTEM

TECHNICAL FIELD

This invention relates to steering systems for four-wheel vehicles.

BACKGROUND OF THE INVENTION

In a typical wheeled vehicle, two wheels at one end (usually the rear end) of the vehicle will be mounted for rolling movement and held against turning while the wheels at the other end (usually the front end) are mounted for rolling and for turning movement. If the vehicle is to be steered to the left or right, the front wheels will be turned in the same direction and the vehicle will move in a curve about a point located generally on a line through the axes of the rear wheels. The further this point is away from the vehicle, the greater the turning radius of the vehicle. For high maneuverability, the vehicle should be capable of having a "zero" turning radius, wherein the vehicle can turn to the left about the left rear wheel or to the right about the right rear wheel.

To avoid scuffing or slipping of the front wheels as the vehicle is turning, the front wheels must rotate unequal amounts during turning. Ideally, each of the front wheels should be perpendicular to the radius line from the center of turning to the center of that front wheel.

In conventional steering mechanisms using lever arms, bell cranks and tie rods or links, turning forces increase as the wheels are turned from center. These steering forces become execessively high as the turning radius approaches zero.

It is an object of the present invention to provide a steering system which will provide a difference in turning of the two steering wheels to prevent excessive tire scuffing, and which will provide a zero turning radius without excessive force being required to turn the steering wheels.

STATEMENT OF THE INVENTION

The present invention is directed to overcoming the problems set forth above and towards fulfilling the above object.

In general, the present invention provides a steering system for a four-wheeled vehicle having a pivot post for each front wheel, an eccentric sprocket on each pivot post, a drive sprocket turnable in either direction by a manually operable steering member and a chain means trained around the eccentric sprockets and drive sprocket.

Additionally, positive chain tautening means are provided to non-yieldably maintain the chain means taut as the distance from the eccentric sprockets to the drive sprocket varies during turning.

Other aspects and advantages of the invention will be set forth in the course of the following detailed description.

BRIEF DESCRIPTION OF THE DRAWINGS

In the drawings, forming a part of this application, and in which like parts are designated by the same reference numerals or letters throughout the same.

FIG. 3 is a sectional view, taken on line 3—3 of FIG. 1, showing in plan, the wheeled base of the mobile work platform unit.

FIGS. 4 and 6 are diagrams showing the position of the wheels of the unit at a maximum left turn and a maximum right turn, respectively.

FIGS. 5 and 7 are views, similar to FIG. 3, illustrating the position of the steering system elements at a maximum left turn and a maximum right turn, respectively.

DESCRIPTION OF THE PREFERRED EMBODIMENT

Figure 1:
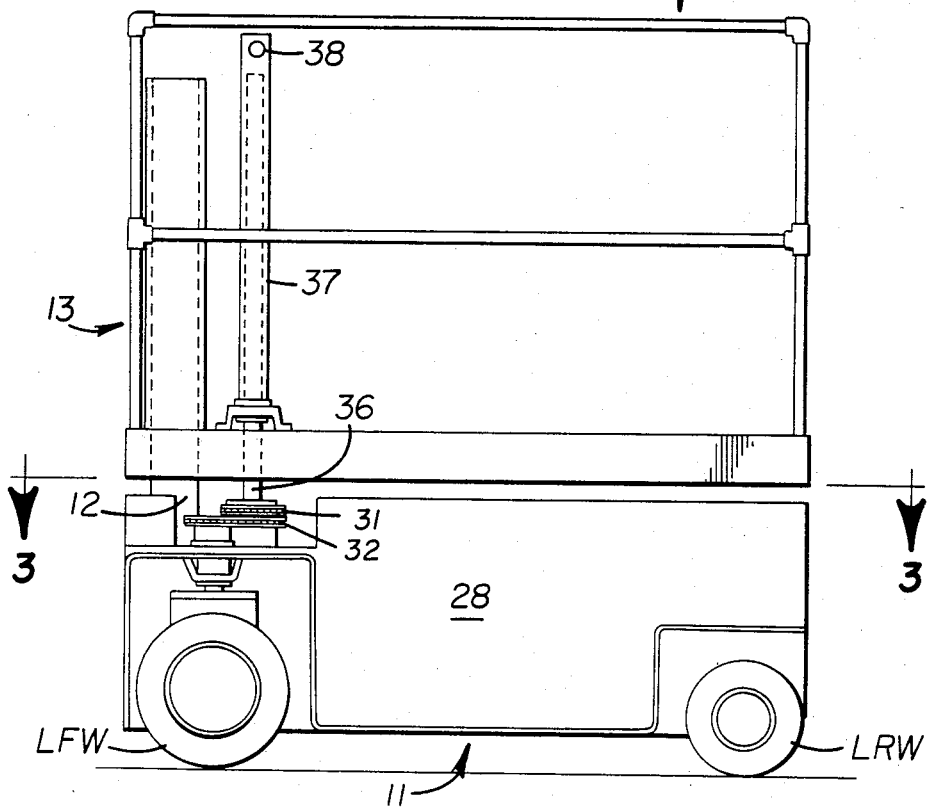
FIG. 1 is a side elevational view of a mobile work platform unit utilizing the steering system of the present invention.

Referring now to the drawings, wherein a preferred embodiment of the invention is shown, the mobile work platform unit 10 includes a wheeled base 11 having a vertically extending mast 12 on which work platform 13 is mounted for vertical movement. Suitable power mechanism (not shown) is provided for raising and lowering work platform 13 relative to base member 11.

Figure 2:
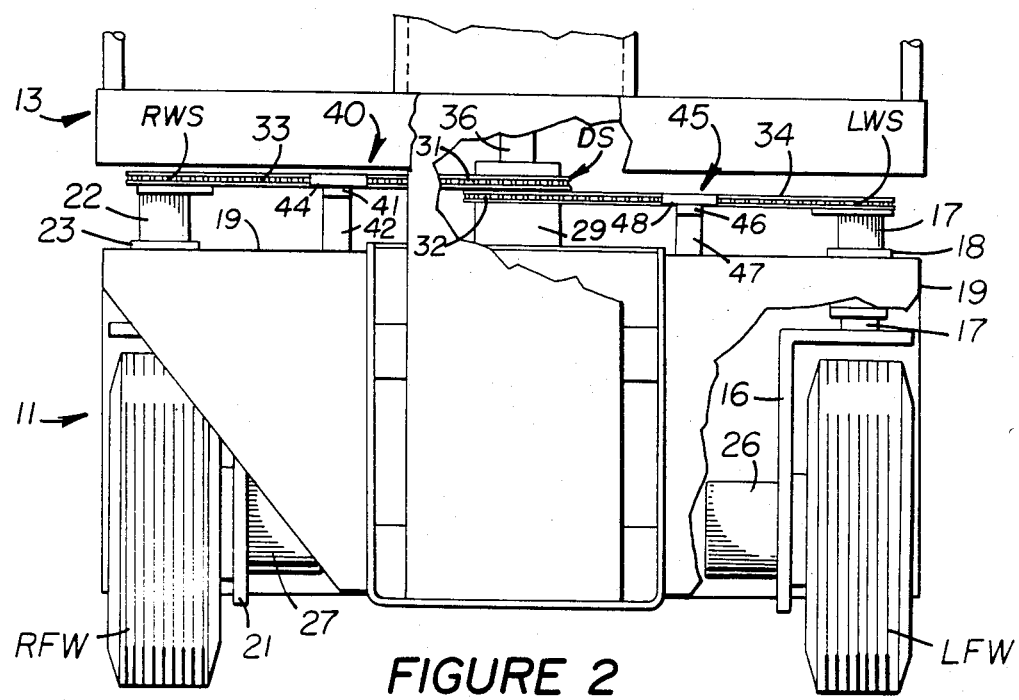
FIG. 2 is a front elevational view of the unit of FIG. 1.

Base member 11 has mounted thereon right and left front wheels, RFW and LFW, respectively, and right and left rear wheels, RRW and LRW, respectively. The rear wheels are mounted for rotation about their horizontal axis and held against turning movement about their vertical axes. The front wheels, RFW and LFW, are mounted for rotation about their horizontal axes and also for turning movement about their vertical axes. For example, as shown in FIG. 2, the left front wheel LFW is rotatably mounted on bracket 16. Vertical post 17, fixed to bracket 16 and having an axis $C_{LFW}$ coincident with the vertical axis $C_{LFW}$ of the left front wheel, is journaled for turning movement in bearing 18 mounted on frame 19 of the base member. In like manner the right front wheel RFW is rotatably mounted on bracket 21, with bracket post 22 being journaled in bearing 23. The vertical axis of post 22 is coincident with the vertical axis of the right front wheel RFW so that rotation of post 22 about its vertical axis will cause a corresponding turning movement of the right front wheel.

Fluid motors 26 and 27 are mounted on wheel brackets 16 and 21 to provide power drive to the front wheels. A conventional power source, including a fluid pump, a fluid reservoir, and electrical batteries, is conventionally mounted in the mid portion 28 of base member 11.

The steering system of the present invention includes right and left wheel sprockets RWS and LWS fixed to bracket posts 22 and 17, respectively, and a drive sprocket DS mounted on post 29 for axial rotation generally centrally of base frame 19. Drive sprocket DS includes upper and lower coaxial sprocket members 31 and 32 fixed together for unitary movement. A first standard roller chain 33 is trained around upper drive sprocket member 31 and the right wheel sprocket RWS and a second standard roller chain 34 is trained around the lower drive sprocket member 32 and the left wheel sprocket LWS.

While chains and sprockets are preferred, wire rope, cog belts, or other non-extensible devices with appropriate pulleys may be used in lieu of the chains and sprockets.

Shaft 36 is fixed to drive sprocket DS and extends upwardly into vertical sleeve 37 which is mounted for axial rotation on work platform 13. Shaft 36 and sleeve 37 are non-circular in cross-section, permitting work platform 13 and sleeve 37 to be moved vertically relative to shaft 36 while retaining a rotary drive connection between sleeve 37 and shaft 36. A handle bar 38 is fixed to the upper end of sleeve to enable a workman to turn sleeve 37, shaft 36, and drive sprocket DS to steer the mobile platform unit 10.

As illustrated in FIGS. 2 and 3, the left wheel sprocket LWS is mounted eccentrically on bracket post 17, with the center $C_{LWS}$ of the left wheel sprocket being offset from the vertical axis $C_{LFW}$ of the left front wheel, and offset in a direction toward the drive sprocket DS. Similarly, the right wheel sprocket RWS is eccentrically mounted on bracket post 22, with its center $C_{RWS}$ offset from the vertical axis $C_{RFW}$ of the right front wheel and offset in direction toward drive sprocket DS.

A first positive chain tautening means 40 is provided to enable the center of the right wheel sprocket RWS to be moved towards or away from the axis of drive sprocket DS while maintaining chain 33 in proper tautness. Chain tautening means 40 includes a rigid arm 41 pivotally mounted on post 42 and extending towards chain 33. Arm 41 is pivotally connected, at 43, to link 44 of chain 33. A second positive chain tautening means 45 is likewise provided for chain 34, with rigid arm 46 pivotally mounted on post 47 and pivotally connected at 48 to link 49 of chain 34.

FIG. 4 illustrates the position of the wheels when the operator has rotated handle bar 38 in a counterclockwise direction through 60° to make a maximum left turn. Since it is desired to turn the unit 10 about its left rear wheel LRW, the steering system is to turn the two front wheels so that they are both perpendicular to lines through them to the left rear wheel. The left front wheel will accordingly be turned to the left 90° about its vertical axis. For the particular dimensions of the illustrated unit 10, the right front wheel will be turned 56° degrees leftwardly about its vertical axis.

As seen in FIG. 5, 60° counterclockwise rotation of handle 38 will rotate drive sprocket 60° in a counterclockwise direction with chain 33 being driven in the direction indicated by the arrows. The pull on chain 33, through the portion 33b having link 44 therein, will rotate the right wheel sprocket RWS counterclockwise about its center, i.e. the vertical axis $C_{RFW}$ of the right front wheel, causing the center $C_{RWS}$ of the sprocket to move away from drive sprocket DS. Such sprocket movement will turn the right front wheel leftwardly through 56°.

At the same time, the 60° counterclockwise of drive sprocket DS will exert a pull on chain 34 (on the chain portion 34a opposite to the portion 34b with link 49 therein) to rotate the left wheel sprocket LWS about its axis of rotation $C_{LFW}$ so that the center $C_{LWS}$ of the left wheel sprocket also moves away from drive sprocket DS. Such movement will cause the left front wheel to turn 90° to the left.

FIGS. 6 and 7 illustrate the effect of moving the steering handle 38 a full 60° in a clockwise direction from the neutral point (i.e. the position at which the front wheels are both pointing straight ahead) to make a maximum right turn, with the vehicle turning about the right rear wheel. The 60° degree of rotation of drive sprocket DS will cause chain portion 33a to pull on the right wheel sprocket so that the sprocket rotates 90° about its axis of rotation $C_{RFW}$. Simultaneously, drive sprocket DS will pull on chain portion 34b to rotate the left wheel sprocket LWS 56° about its axis $C_{LFW}$.

FIGS. 8-11 illustrate the principles involved in the operation of an eccentric sprocket steering system so that a particular system can be designed to obtain the desired difference in degree of wheel turning to left and right in response to opposite direction of rotation of the drive sprocket. In each of the four figures, the positions of the left or right wheel sprockets LWS or RWS and the chain portions 33a or 34a, as the case may be, as shown: in solid line when in neutral (straight ahead) position; in dotted lines when rotated 90° counterclockwise (left turn); and, in dot and dash lines when rotated 90° clockwise (right turn). In each of these figures the ratio of the circumference of the wheel sprocket LWS or RWS to the eccentricity of the wheel sprocket (the distance between the center of the sprocket and its axis of rotation) is assumed to be 20:1.

Figure 8:
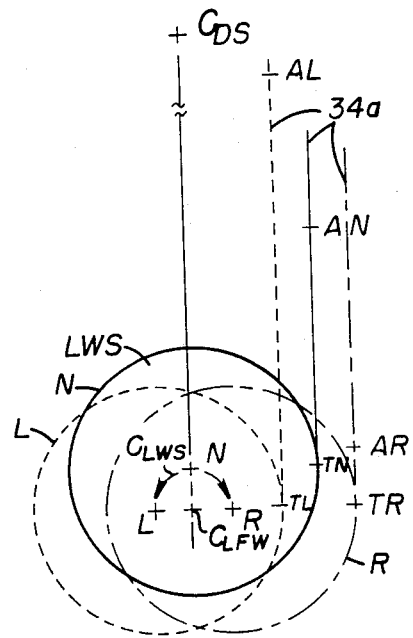
FIGS. 8-11 are diagrams illustrating the principals of operation of a steering system constructed in accordance with the present invention.

FIG. 8 illustrates a steering system wherein a line through the center $C_{LWS}$ of the left wheel sprocket and the center of rotation $C_{LFW}$ of the wheel sprocket coincides with a line through the centers of rotation $C_{LFW}$ and $C_{DS}$ of the wheel sprocket and the drive sprocket DS. For purpose of simplicity, assume that the chain portion 34a is parallel to the line between the sprocket centers when the left wheel sprocket LWS is in any of its neutral (N), 90° left (L), or 90° right (R) positions. Also assume an arbitrary point A on chain portion 34a which is at position AN when the wheel sprocket LWS is in its neutral position. The points TN, TL and TR indicate the tangent points of the chain portion 34a to the wheel sprocket at the neutral, 90° left, and 90° right positions.

If the drive sprocket DS is rotated in a counterclockwise direction, chain portion 34a will be pulled toward the drive sprocket, causing the wheel sprocket LWS to rotate in a counterclockwise direction about its axis of rotation $C_{LFW}$. If the wheel sprocket rotates 90° the center $C_{LWS}$ of the sprocket will move from point N to point L. Likewise, the tangent point of chain porton 34a will move from point TN to point TL. The 90° rotation of the wheel sprocket will unwind $\pi d/4$ (d being the diameter of the wheel sprocket) amount of chain therefrom, an amount equal to 5 times the eccentricity e of the wheel sprocket. However, since the point of tangency has moved from TN to TL, away from the drive sprocket, the point A on the chain portion 34a will move linearly toward the drive sprocket (from AN to AL) by an amount equal to $\pi d/4$ less the increase in distance of the tangent point TL from the drive sprocket. In this particular example, the increase (TL−TN) in distance for 90° of rotation is equal to the eccentricity e of the wheel sprocket. Accordingly, 90° to left rotation of the wheel sprocket LWS (and 90° of left turning of the left front wheel) will occur when the linear movement of chain portion 34a towards the drive sprocket is equal to $(\pi d/4 - e)$. For a wheel sprocket wherein the ratio between the circumference and eccentricity is 20:1; the linear movement of chain portion 34a for 90° left rotation is thus equal to 4e. The amount of rotation of the drive sprocket DS necessary to produce this amount of linear movement of chain portion 34a will depend, of course, on the diameter of the drive sprocket.

If the wheel sprocket LWS is rotated in a clockwise (right turn) direction by a pull from chain portion 34b (not shown in this Fig.), chain portion 34a will be taken up on the wheel sprocket and point A on the chain will move away from the drive sprocket. A 90° clockwise rotation of the wheel sprocket LWS will take up a length of chain equal to $\pi d/4$, d being the diameter of the wheel sprocket LWS. At the same time the tangent point will have moved from TN to TR, away from the drive sprocket, by an amount equal to the eccentricity e. As a consequence, when 90° of clockwise rotation of the left wheel sprocket LWS occurs, the linear movement of chain portion 34a (i.e., from AN to AL) will equal $(\pi d/4+e)$. In this particular case, such movement will equal 6e.

The significance of this is that the amount of clockwise rotation of the drive sprocket DS to produce a particular amount of clockwise rotation (e.g., 90°) is greater than the amount of counterclockwise rotation of the drive sprocket to produce the same amount of counterclockwise rotation of the wheel sprocket. In the particular arrangement shown in FIG. 8, the ratio of clockwise to counterclockwise movement of drive sprocket DS rotation to produce 90° of clockwise (right) or counterclockwise (left) rotation of the left wheel sprocket LW, is equal to 6e:4e, or 1.5:1. Likewise, for a given amount of rotation of the drive sprocket DS in either direction, the degree of counterclockwise (left) rotation of the left wheel sprocket LWS will be greater than the degree of clockwise (right) rotation.

The degree of eccentricity of the wheel sprocket will greatly affect the ratio of left to right rotation of the wheel sprocket for a given amount of drive sprocket rotation. For example, if the eccentricity of the wheel sprocket LWS in FIG. 8 is one-half that assumed above, the $(\pi d/4-e)$ chain movement for 90° left rotation will equal 9e, while the $(\pi d/4+e)$ chain movement for 90° right rotation will equal 11e. The ratio of clockwise to counterclockwise rotation of the drive sprocket for 90° of right or left turns movement of the left wheel sprocket will, accordingly, be reduced to 11e:9e, or, 1.22:1.

Figure 9:
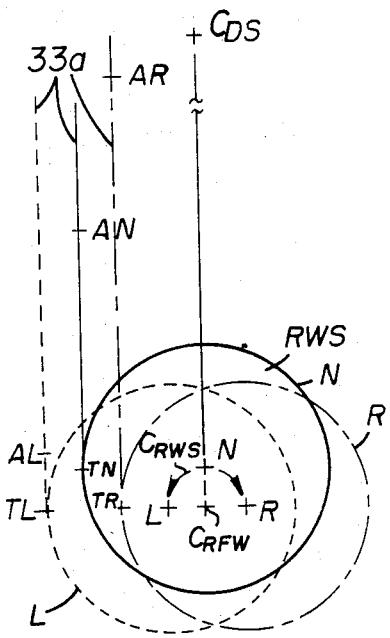

FIG. 9 illustrates the arrangement wherein the right wheel sprocket RWS and chain drive from the drive sprocket DS is a mirror image of the FIG. 8 system. By the same analysis as above, when the drive sprocket DS and the right wheel sprocket RWS both rotate in a counterclockwise (left) direction, and the right wheel sprocket is rotated through 90° point A on chain portion 33a will move from AN to AL, away from the drive sprocket DS by an amount equal to $(\pi d/4+e)$, d and e being the diameter and eccentricity of the right wheel sprocket RWS, which is the same as for the mirror image left wheel sprocket LWS. Likewise, if the right wheel sprocket rotates 90° clockwise (right), point A will move from AN to AR, towards the drive sprocket, by an amount equal to $(\pi d/4-e)$. For the particular wheel sprocket RWS shown in FIG. 9, the ratio of clockwise to counterclockwise rotation of drive sprocket DS to produce 90° of clockwise (right) or counterclockwise (left) rotation of wheel sprocket RWS in equal to $(\pi d/4-e):(\pi d/4+e)$, or 1:1.5, i.e. the reciprocal of the ratio with reference to the left wheel sprocket LWS.

Thus, in a steering system utilizing the mirror image sprocket arrangements of both FIGS. 8 and 9, if the drive sprocket DS is rotated counterclockwise an amount to pull chain portion 34a through a distance $(\pi d/4-e)$, the left wheel sprocket LWS will turn 90° to the left. At the same time, the chain portion 33b will also move through the same distance $(\pi d/4-e)$, causing the right wheel sprocket to turn through a lesser angle to the left. Conversely, if the drive sprocket DS is rotated clockwise from neutral by the same amount, chain portions 33a and 34b will again move through a distance $(\pi d/4-e)$, causing the right wheel sprocket to turn 90° right and the left wheel sprocket to turn through a lesser angle to the right.

Figure 10:
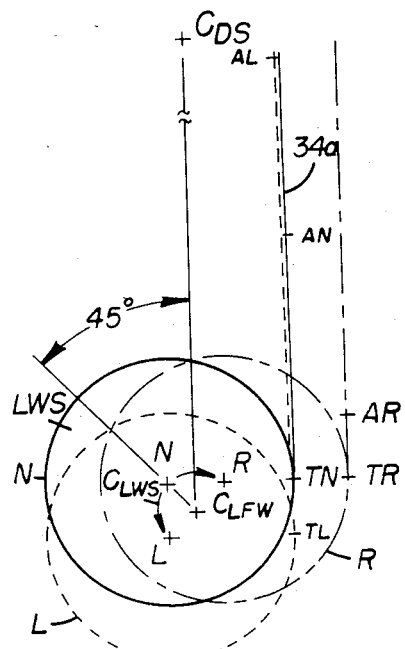

FIG. 10 illustrates an arrangement similar to FIG. 8, but with the line through $C_{LFW}$ and $C_{LWS}$ is at −45° to the lines $C_{LFW}$ and $C_{DS}$ when the left wheel sprocket is at neutral position. In this case, if the left wheel sprocket LWS is rotated through 90° in a counterclockwise (left) direction, tangent point TN will have moved away from the drive sprocket to TL, a distance equal to $e\sqrt{2}$. As a consequence, chain point A will have moved a distance $(\pi d/4-e\sqrt{2})$ from AN to AL. If the left wheel sprocket LWS rotates 90° to the right, the tangent points TN and TR will be equidistant from the drive sprocket, and the chain portion 34a will have moved through a distance equal to $(90\ d/4)$. The ratio of clockwise to counterclockwise rotation of drive sprocket DS to produce 90° right or 90° left rotation of the left wheel sprocket LWS is equal to $(\pi d/4):(\pi d/4-e\sqrt{2})$, or 1,394:1 for a wheel sprocket wherein $\pi d=20e$.

Figure 11:
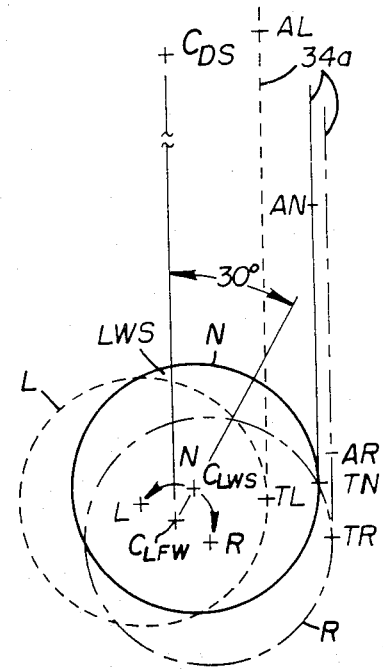

FIG. 11 illustrates an arrangement wherein the angle between the lines $C_{LFW}$-$C_{LWS}$ and $C_{LFW}$-$C_{DS}$ is +30°. As before, the amount of linear movement of chain 34a for a 90° left rotation of the wheel sprocket LWS is equal to $\pi d/4$ less the increase in distance from the drive sprocket that the tangent point has moved from TN to TL. Likewise, the amount of linear movement of chain 34a for 90° of right rotation of LWS is equal to $\pi d/4$ plus the increase in distance from the drive sprocket of the tangent point TL relative to TN. For the particular arrangement in FIG. 11 the ratio of clockwise to counterclockwise rotation of drive sprocket DS to produce 90° right or 90° left rotation of the left wheel sprocket LWS is equal to about 1.37:1.

Other angular relationships between the linear $C_{LFW}$-$C_{LWS}$ and $C_{LFW}$-$C_{DS}$ will result in different degrees of chain movement and different ratios of drive sprocket rotation. However, as long as the center $C_{LWS}$ of the wheel sprocket LWS is closer to the center $C_{DS}$ of the drive sprocket, than the center of rotation $C_{LFW}$ of the wheel sprocket when the left wheel sprocket is at neutral position, the ratio of clockwise to counterclockwise rotation of drive sprocket DS to produce 90° right or 90° left rotation of the left wheel sprocket LWS will be greater than one The greatest ratio exists when the system is arranged as in FIG. 8. If the center $C_{LWS}$ of the wheel sprocket LWS is further from the center $C_{DS}$ of the drive sprocket than the center of rotation $C_{LFW}$ when the wheel sprocket is at neutral position, the ratio of clockwise to counterclockwise rotation of the drive sprocket to produce 90° right or 90° left rotation of the wheel sprocket will be less than one. This latter arrangement would be undesirable for use in the steering system of the present invention since on a left turn the left wheel would turn less there the right wheel (or vice versa or a right turn) which is opposite to what is desired.

In designing a steering system to turn the vehicle about a rear wheel, the spacing between the four wheels will determine the ratio of turning of the front wheels. For example, in the vehicle illustrated in FIGS. 1-7, the ratio is 90°:56°, or 1.61:1. A desirable diameter is selected for the wheel sprockets. The angle between the lines $C_{LFW}-C_{LWS}$ and $C_{LFW}-C_{DS}$ when the left wheel sprocket is in neutral position, and the eccentricity of the wheel sprocket is determined so that the same degree of clockwise or counterclockwise rotation of the drive sprocket from neutral will produce 56° of right rotation or 90° left rotation of the left wheel sprocket. The degree of rotation of the drive sprocket to produce maximum turning is determined by the relative diameter of the drive and wheel sprockets. The design of one half the steering system will determine the other half, since the two halves are mirror images of each other.

In designing the steering system, a suitable positive chain tautening means 40 must be provided for each eccentric wheel sprocket LWS and RWS. As is seen from the above, if the drive sprocket DS is rotated in a clockwise direction, the left wheel sprocket LWS will be rotated by the pull of the chain portion 34b. If the chain portions 34b were resiliently biased to a taut position, such as the position on of FIG. 3, a pull on the chain portion 34b could cause the bias means to compress so that the chain would straighten without linear movement, i.e., without causing a right turning of the left wheel sprocket.

In a system wherein the distance between the wheel and drive sprockets increases fairly uniformly in each direction of turn from an intermediate point, such as disclosed in FIGS. 1-7, a rigid arm 46, pivotally connected to frame post 47 and to chain link 49, can be used to provide a positive, non-compressive means for maintaining the chain taut as the distance between the centers of the wheel and drive sprocket varies. The three positions of pivot point 48 in FIGS. 3, 5 and 7 will determine a circle. The center of the circle will locate frame post 47 and the radius of the circle will determine the length of arm 46.

As may be seen from the foregoing, the present invention has a significant advantage in that the steering forces remain relatively constant. The force required to turn the outside wheel is reduced as the force required to turn the inside wheel is increasing.

I claim:

1. A steering system for a wheeled vehicle having a generally horizontal frame, first and second wheels at one end of said frame and third and fourth wheels at the other end of said frame, said first and second wheels each being turnable about its own vertical axis, the steering system comprising:
   first and second posts mounted on said frame for axial rotation,
   means for turning said first wheel about its vertical axis in response to axial rotation of said first post,
   means for turning said second wheel about its vertical axis in response to axial rotation of said second post,
   a manually operable steering member movable in opposite directions,
   a first wheel sprocket fixed on said first post for rotation therewith, the center of said first wheel sprocket being offset from the axis of said first post,
   a second wheel sprocket fixed on said second post for rotation therewith, the center of said second wheel sprocket being offset from the axis of said second post,
   a drive sprocket connected to said steering member for axial rotation of said drive sprocket in response to movement of said steering member,
   chain means trained around said first and second wheel sprockets and said drive sprocket for rotation of said first and second wheel sprockets in one direction from their neutral position in response to rotation of said drive sprocket in one direction from its neutral position, and for rotation of said first and second wheel sprockets in the opposite direction from their neutral positions in response to opposite rotation of said drive sprocket from its neutral position,
   means for positively and unyieldingly maintaining said chain means taut around said wheel and drive sprockets during rotation of said sprockets in both directions of rotation thereof.

2. A steering system as set forth in claim 1 wherein said means for positively and unyieldingly maintaining said chain means taut includes:
   a first rigid arm,
   means pivotally connecting one end of said first rigid arm to said frame,
   means connecting the other end of said first rigid arm to a link of said chain means at a location thereon between said drive sprocket and said first wheel sprocket,
   a second rigid arm,
   means pivotally connecting one end of said second rigid arm to said frame,
   means connecting the other end of said second rigid arm to a link of said chain means at a location thereon between said drive sprocket and said second wheel sprocket.

3. A steering system as set forth in claim 1, wherein the center of said first wheel sprocket is closer to the axis of said drive sprocket than the axis of said first post and the center of said second wheel sprocket is closer to the axis of said drive sprocket than the axis of said second post when said drive sprocket is in its neutral position.

4. A steering system as set forth in claim 1, wherein said drive sprocket comprises first and second coaxial drive sprocket members fixed together for unitary rotation, and wherein said chain means includes a first chain trained around said first wheel sprocket and said first drive sprocket member and a second chain trained around said second wheel sprocket and said second drive sprocket member.

5. A steering system as set forth in claim 4, wherein said means for positively and unyieldingly maintaining said chain means taut includes:
   a first chain tautening means for positively and unyieldingly maintaining said first chain taut around said first wheel sprocket and said first drive sprocket member during rotation of said first wheel sprocket in either direction from its neutral position,
   a second chain tautening means for positively and unyieldingly maintaining said second chain taut around said second wheel sprocket and said second drive sprocket member during rotation of said second wheel sprocket in either direction from its neutral position.

6. A steering system as set forth in claim 5,
   wherein said first chain tautening means includes a first rigid arm, means pivotally connecting one end of said first arm to said frame, and means connecting the other end of said arm to a link of said first chain, and
   wherein said second chain tautening means includes a second rigid arm, means pivotally connecting one end of said second arm to said frame, and means connecting the other end of said second arm to a link of said second chain.

* * * * *

UNITED STATES PATENT AND TRADEMARK OFFICE
CERTIFICATE OF CORRECTION

PATENT NO. : 4,504,074

DATED : March 12, 1985

INVENTOR(S) : DANIEL G. SMITH

It is certified that error appears in the above-identified patent and that said Letters Patent is hereby corrected as shown below:

Col. 4, para 3, line 56 change "to" to --of--.

Col. 6, para 1, line 22 change "(90 d/4)." to --($\pi$ d/4).--.

Col. 6, para 1, line 26 change "1,394:1" to --1.394:1--.

Signed and Sealed this

Third Day of September 1985

[SEAL]

Attest:

DONALD J. QUIGG

Attesting Officer     Acting Commissioner of Patents and Trademarks - Designate